United States Patent [19]

Thomas et al.

[11] 4,088,737

[45] May 9, 1978

[54] DRY METHOD FOR RECYCLING IODINE-LOADED SILVER ZEOLITE

[75] Inventors: Thomas R. Thomas; Bruce A. Staples; Llewellyn P. Murphy, all of Idaho Falls, Idaho

[73] Assignee: The United States of America as represented by the United States Department of Energy, Washington, D.C.

[21] Appl. No.: 737,650

[22] Filed: Nov. 2, 1976

[51] Int. Cl.$^2$ .............................................. B01D 53/34
[52] U.S. Cl. ................................... 423/240; 423/241; 423/487; 55/71; 55/75; 252/301.1 W; 176/37
[58] Field of Search ............... 423/210, 240, 241, 487; 55/71, 75; 252/301.1 W; 176/37

[56] References Cited

U.S. PATENT DOCUMENTS 3,658,467   4/1972   Maeck .................................. 423/240

OTHER PUBLICATIONS

Sneed et al., "Comprehensive Inorganic Chemistry," vol. 2, 1954, D. Von Nostrand Co. Inc., N.Y. 1954, p. 160.

Primary Examiner—Earl C. Thomas
Attorney, Agent, or Firm—Dean E. Carlson; Frank H. Jackson; James W. Weinberger

[57] ABSTRACT

Fission product iodine is removed from a waste gas stream and stored by passing the gas stream through a bed of silver-exchanged zeolite until the zeolite is loaded with iodine, passing dry hydrogen gas through the bed to remove the iodine and regenerate the bed, and passing the hydrogen stream containing the hydrogen iodide thus formed through a lead-exchanged zeolite which adsorbs the radioactive iodine from the gas stream and permanently storing the lead-exchanged zeolite loaded with radioactive iodine.

10 Claims, 2 Drawing Figures

Desorption Rate of HI From Ag IX
(mg HI / min-cm$^2$)

Desorption Rate of HI From AgIX
(mg HI / min-cm$^2$)

$I_2$ Loading Capacity of Recycled AgX In Dry Air.

DRY METHOD FOR RECYCLING IODINE-LOADED SILVER ZEOLITE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method for the removal of radioactive iodine from a waste gas stream. More specifically, this invention relates to a method for the removal and long-term storage of radioactive iodine from waste gas streams and particularly from waste gas streams associated with the reprocessing of irradiated nuclear reactor fuel elements.

Of importance to safety in the field of atomic energy power generation is the recovery and storage of radioactive iodines from waste gas streams to prevent dispersion to the environment where they may ultimately be ingested by humans and animal life. These radioactive iodines which include inorganic species such as elemental iodine and organic species such as methyl iodide, may be present in reactor containment vessels from normal reactor operation and in particular in the case of fuel element cladding failure. These iodines are also present in waste gas streams containing off-gases from fuel element dissolver operations in nuclear fuel reprocessing plants. These radioactive iodines are formed in the nuclear reactor fuel by the fission of the fuel material. Of particular interest in addition to $^{131}$I is radioactive iodine $^{129}$I which has a very long half-life and for which long-term storage must therefore be provided.

One method for the recovery of these radioactive iodines is described in U.S. Pat. No. 3,658,467, which issued Apr. 25, 1972 to Maeck, and is assigned to the present assignee. As described in that patent, the waste gas stream containing the radioactive iodine species is passed through a filter bed of synthetic zeolite in a metal ion-exchanged form, the metal being one which is reactive with iodine. The patent suggests the use of a number of metals, such as silver, mercury, thallium, lead and palladium. Of these, the silver metal ion-exchanged zeolite has proven best for adsorbing large amounts of iodine and retaining the iodine under the conditions in which the bed of material must operate.

Silver, however, in addition to being expensive is a valuable resource which is useful for a variety of purposes other than the long-term storage of radioactive iodines. What then is needed is a method for removing the adsorbed iodine from the silver-exchanged zeolite, regenerating the silver-exchanged zeolite and adsorbing the desorbed iodine on a less expensive and more widely available material for long-term storage.

SUMMARY OF THE INVENTION

We have developed a method of removing and storing radioactive iodine from a waste gas stream which overcomes the problems enumerated hereinbefore by passing the waste gas stream containing the radioactive iodines through a silver-exchanged zeolite until the zeolite is loaded with iodine, passing hydrogen through the iodine-loaded silver-exchanged zeolite to desorb the iodine from the zeolite, thereby regenerating the zeolite and forming hydrogen iodide in the hydrogen, passing the hydrogen stream containing the hydrogen iodide through a lead-exchanged zeolite until the zeolite is loaded with iodine and permanently storing the thus-formed zeolite loaded with radioactive iodine.

It is therefore one object of the invention to provide a method for removing radioactive iodines from a waste gas stream.

It is another object of the invention to provide a method for removing radioactive iodines from a waste gas stream and providing long-term permanent storage for the iodines.

Finally, it is the object of the invention to provide a method for desorption of radioactive iodines and the regeneration of silver-exchanged zeolites.

DESCRIPTION OF THE PREFERRED EMBODIMENT

Figure 1:
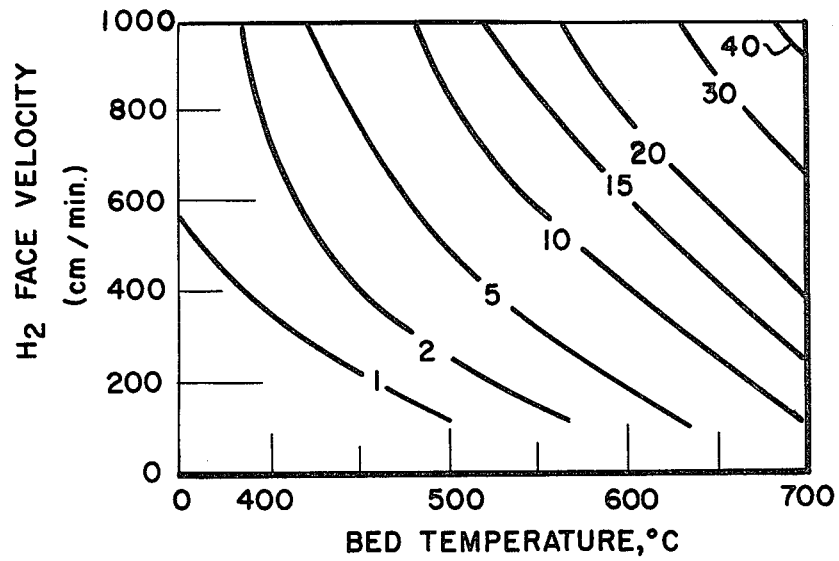
FIG. 1 is a graph showing the desorption rate of hydrogen iodide from a silver-exchanged zeolite under different face velocity and temperature conditions.

These and other objects of the inention may be met by passing the waste gas stream containing radioactive iodine through a bed of silver-exchanged zeolite until the zeolite is loaded with iodine, passing hydrogen gas through the iodine-loaded silver-exchanged zeolite at a temperature of 400° to 550° C. to desorb the iodine as hydrogen iodide and regenerate the zeolite, passing the hydrogen gas stream containing the hydrogen iodide at a temperature of 80° to 250° C. through a lead-exchanged zeolite bed whereby the iodine is adsorbed on the lead-exchanged zeolite, and permanently storing the thus-formed zeolite loaded with radioactive iodine.

Synthetic zeolites of the sodalite and mordenite groups may be used to practice this invention. The pore size of the zeolite must be of adequate size to permit the passage of iodine therethrough. One such zeolite having an adequate pore size has the following general formula expressed in terms of mole fractions of oxides: $0.9 \pm 0.2$ $M_{2/n}O:Al_2O_3: 2.5 + 0.5$ $SiO_2:O$ to $8$ $H_2O$, where M represents a cation, for example hydrogen or a metal, and "$n$" its valence. This compound is known as zeolite X and is described and claimed in U.S. Pat. No. 2,882,244, issued Apr. 14, 1959 to R. M. Milton. Zeolite X is available commercially under the trade name of Linde Molecular Sieve 13X and was used in the experiments hereinafter described. Zeolite Z has also been found satisfactory (commercially available under the trade name of Norton Zealon-900) and is more thermally stable and thus withstands regeneration better than Zeolite X. Both the granular and spherical forms of the zeolite are satisfactory.

The composition of a waste gas stream from the process off-gas of a nuclear reactor fuel-reprocessing plant will depend upon the type of reactor fuel which is undergoing reprocessing. For example, the reprocessing of a high-temperature gas reactor (HTGR) fuel will produce an off-gas which is approximately 85% $CO_2$ with the remainder CO, $O_2$, $N_2$, NO and the radioactive contaminants of iodine, tritium, radon and krypton. The reprocessing of a light water reactor fuel will result in an off-gas which is air, containing water vapor, $NO_x$, and radioactive contaminants of iodine, tritium and krypton.

The waste gas stream containing the radioactive iodine and other contaminants is first passed through a bed of silver-exchanged zeolite which adsorbs and removes the iodine contaminants. The gas stream is then passed through other beds and undergoes additional processing for removal of the other contaminants before it is exhausted to the atmosphere. The waste stream is passed through the silver-exchanged zeolite until the zeolite is loaded with iodine, at which time the flow of the stream may be diverted to a second bed or stopped. The bed is generally maintained at the same temperature as the gas stream which is generally about 150° C. as it comes from the dissolver, to prevent condensation of any moisture which may be present. However, bed temperatures from ambient to about 300° C. have been shown to have no adverse effect upon the ability of the silver-exchanged zeolite to adsorb elemental iodine or methyl iodide except for a slight reduction in bed capacity at the higher temperatures. It might be noted that removal of the iodine from the waste gas stream is by chemisorption rather than physical adsorption, and that the AgI formation is not restricted in $CO_2$ or air atmospheres but is affected by the increased presence of moisture and $NO_x$.

The iodine is desorbed from the iodine-loaded silver-exchanged zeolite and the zeolite regenerated by passing hydrogen gas through the zeolite bed at a temperature from 400° to 550° C., the iodine being desorbed as hydrogen iodide which passes into the $H_2$ gas stream. Temperatures below 400° C. produce a very slow desorption rate, while temperatures above about 550° C. cause a phase change in the silver iodide to a liquid which will result in structural damage to the zeolite and reduced subsequent capacity of the silver zeolite for iodine. Preferably the temperatures of the bed and the gas are about the same.

The hydrogen stream may be pure hydrogen or it may be diluted with an inert gas such as nitrogen, argon, helium, etc., which will slow the hydrogen iodide desorption process. The presence of moisture in the gas will adversely affect the process, therefore as a general practice the system is dried before starting the desorption process. The presence of oxidizing gases such as oxygen are to be avoided as it presents an explosion hazard in the presence of hydrogen. The face velocity of the hydrogen through the zeolite should preferably be at least 100 cm/min in order to attain a reasonable rate of iodine desorption. There is no apparent upper limit as to face velocity of the gas.

The hydrogen gas stream containing the desorbed iodine as hydrogen iodide is then passed through a lead-exchanged zeolite at a temperature of 80° to 250° C., preferably 80° to 200° C., where the iodine is adsorbed on the zeolite and thus removed from the hydrogen gas stream which may then be recycled.

The iodine-loaded lead-exchanged zeolite is then stored in any available appropriate permanent storage facility, which may be under ground, open air in an appropriate container or in some other approved facility for long-term storage.

EXAMPLE

A series of tests were made to determine the feasibility of the present invention for the recovery and storage of radioactive iodine. The metal-exchanged zeolites were prepared by ion exchange with 1.6 mm spheres of Linde Molecular Sieve Type 13X. Batch-exchange procedures were used in which the zeolite was contacted several times with a hot solution of the desired metal nitrate or acetate. The exchanged zeolites were washed with distilled water until excess cations were removed and dried by purging with dry air at 100° C. The extent of exchange was measured by dissolving samples in nitric acid and analyzing the amount of sodium which remained in the exchanged zeolites by flame-emission spectroscopy. Analysis indicated 99.9 and 98% exchange for $Ag^+$ and $Pb^{++}$, respectively.

Iodine loading tests were conducted by passing heated air streams containing desired amounts of water vapor, contaminant gases and airborne elemental iodine tagged with iodine-131 through test beds of zeolite. Iodine breakthrough was detected by passing an effluent slipstream through a small adsorbent bed monitored by a gross-gamma counter. Silver-exchanged zeolite was used for backup beds. A Pyrex cylinder 5 cm in diameter was used for a test bed holder. Up to 15-cm bed depths were tested and each 2.5-cm segment was analyzed for its iodine content. A gamma spectrometer was used to determine the amount of iodine-131 in the test beds and based on the known ratios of iodine-127/iodine-131, the iodine loadings were obtained. Up to 60 g sources of tagged iodine were prepared by adding 10 mCi of iodine-131 to elemental iodine dissolved in diethyl ether. The solution was evaporated to dryness and the crystalline iodine was transferred in the vapor phase by a heated air stream into a condenser where it was recrystallized. Airborne iodine was introduced into the carrier gas by passing hot water through the outer jacket of the condenser and purging the crystalline iodine with helium.

Iodine desorption tests were conducted in which a silver-exchanged zeolite containing iodine (AgIX) was purged with pure hydrogen ($H_2$), and the desorbed hydrogen iodide (HI) was recovered downstream on lead-exchanged zeolite (PbX). During the desorption tests the effluent from the AgIX bed was sampled with a 10-cm quartz absorption cell and the absorbance by HI in the cell was measured with a UV-VIS spectrophotometer. The partial pressures of HI, which ranged between 0.0005 to 0.005 atmospheres, were obtained for several bed temperatures and superficial face velocities throughout the test space. The results are shown in FIG. 1. The observed desorption rates agree within 10.7 ± 5.8% of the predicted rates on the response surface. A tailing effect at 400° and 500° C occurs in which the $P_{HI}$ continually decreases to zero after 80 to 90% of the iodine is desorbed. The tailing effect causes the average desorption rate for 99% + removal of iodine to be about 2.5 times less than that predicted.

Figure 2:
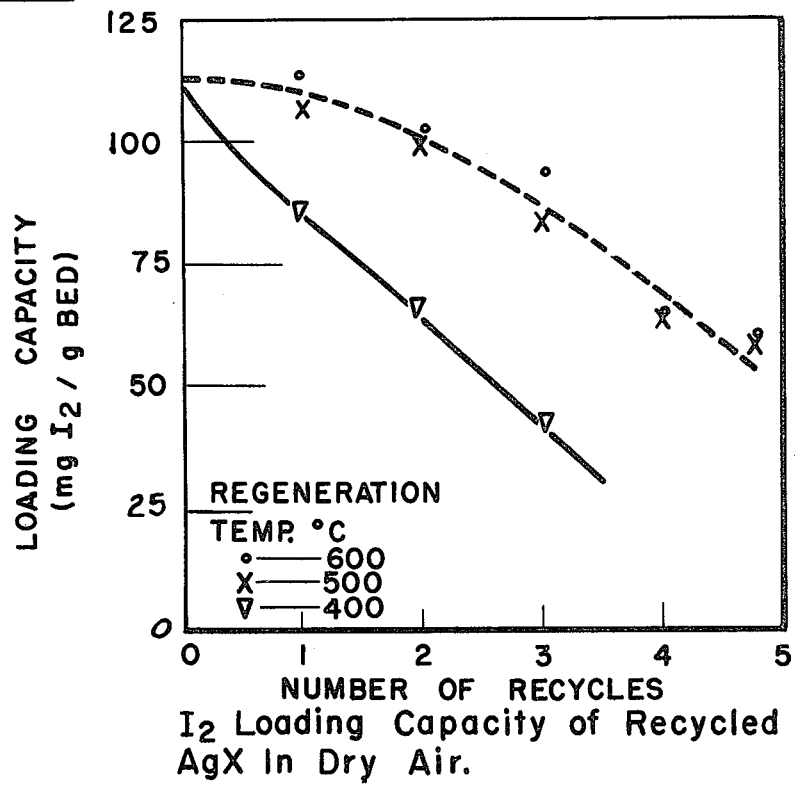
FIG. 2 is a graph showing the effect of regeneration temperature of recycled silver-exchanged zeolite loading capacity.

Recycle tests on three 5-cm deep beds, in which iodine was repeatedly loaded and stripped, were run to test the effect of regeneration temperature on loading capacity. The results of the test are shown in FIG. 2. When regeneration was at 600° C., the loading capacity decreased about threefold after three cycles. Using regeneration temperatures of 400° or 500° C. caused the loading capacity to decline about twofold after five cycles. There is no apparent difference between using a regeneration temperature of 400° or 500° C., but a large one exists between 500° and 600° C. The total exposure of the beds to 400°, 500° and 600° C. were 500, 90 and 10 hr respectively.

The desorbed iodine was adsorbed on PbX beds at 150° C. downstream of the AgX beds being stripped. Using a superficial face velocity of 500 cm/min, an average loading capacity at breakthrough of 317 mg $I_2$/g PbX based on four tests was obtained. One of the loaded PbX beds was post-purged with $H_2$ at 150° C. for 16 hr and no detectable loss of iodine occurred. Another loaded PbX bed was immersed in distilled water at room temperature for several days and the solubility of the adsorbed iodine was found to be about 26 mg $I_2$/100 mls $H_2O$.

As can be seen, this invention provides a safe, effective and relatively inexpensive method for solving the problem of radioactive iodine recovery and long-term storage. Given below is an application of this method as it might be applied to a nuclear fuel reprocessing plant.

APPLICATION OF ADSORBENT TECHNOLOGY

A typical application in a 5 tonne/day reprocessing plant might be to remove 600 kg/yr (iodine-129 plus iodine-127) of iodine from a 140 m³/min off-gas stream. Assuming that a loading of 50 mg $I_2$/g AgX can be obtained at a decontamination factor (DF) of $10^3$ using a superficial face velocity of 60 m/min in the presence of $NO_2$ and water vapor, a conceptual design of an iodine removal system has been developed which uses two 2 m³ beds of AgX. The resulting bed dimensions would be a diameter (d) of 1.71 m and length (l) of 0.86 m for a d/l ratio of 2 and bed weights of 1.78 metric ton each. If the iodine loading rate averaged 2 kg/day, then one of the beds would last about 40 days before breakthrough. Using a regeneration temperature of 500° C. and a hydrogen face velocity of 200 cm/min (flow = 4.66 m³/min), the predicted desorption rate would be 1.5 mg HI/min-cm². When adjusted for tailing the average desorption rate would be about 0.6 mg HI/min-cm², which would require about 4.2 days to regenerate the bed. Each bed would be recycled about four times per year or 20 to 30 times in a five-year period. During this period the loading capacity would be declining and the frequency of recycle increasing. The important feature is that the loaded beds could easily be stripped of iodine and reused several times. This would permit small AgX inventories and more favorable d/l ratios since a maximum loading would not be necessary. In the end, the silver could be reclaimed by conventional wet chemistry techniques provided the bed was not too contaminated by other radioisotopes. The stripped iodine would be loaded onto PbX beds for permanent fixation and storage. For 600 kg of $I_2$ about 2.5 metric ton or 1.7 m³ of waste per year would be generated.

The embodiments of the invention in which an exclusive property or privilege is claimed are defined as follows:

1. A method of removing radioactive iodine from a waste gas stream and storing the same comprising: passing the waste gas through a silver-exchanged zeolite until the zeolite is loaded with iodine, passing hydrogen through the zeolite to remove the iodine as hydrogen iodide and regenerate the zeolite, passing the hydrogen stream containing the hydrogen iodide through a lead-exchanged zeolite until the zeolite is loaded with iodine and storing the radioactive-iodine-loaded zeolite.

2. The method of claim 1 wherein the hydrogen is passed through the iodine-loaded silver-exchanged zeolite at a temperature of about 400° to 550° C.

3. The method of claim 2 wherein the hydrogen containing the hydrogen iodide is passed through the lead-exchanged zeolite at a temperature of about 80° to 250° C.

4. The method of claim 3 wherein the waste gas stream is at a temperature between ambient and 300° C.

5. The method of claim 4 wherein the zeolites are selected from the group consisting of zeolite X and zeolite Z.

6. A method for regenerating iodine loaded silver-exchanged zeolite and recovering the iodine for storage comprising: passing an oxygen-free gas stream containing hydrogen through the iodine loaded silver-exchanged zeolite to desorb the iodine as hydrogen iodide thereby regenerating the silver zeolite; passing the gas stream containing the hydrogen iodide through lead-exchanged zeolite whereby the iodine is adsorbed on the lead-exchanged zeolite, and storing the lead-exchanged zeolite loaded with iodine.

7. The method of claim 6 wherein the gas stream is passed through the iodine loaded silver-exchanged zeolite at a temperature of about 400° – 550° C.

8. The method of claim 7 wherein the gas stream containing the hydrogen iodide is passed through the lead-exchanged zeolite at a temperature of about 80° to 250° C.

9. The method of claim 8 wherein the gas stream is pure hydrogen.

10. The method of claim 9 wherein the zeolite is selected from the group consisting of zeolite X and zeolite Y.

* * * * *